(12) United States Patent
Kenowski

(10) Patent No.: US 10,315,921 B2
(45) Date of Patent: Jun. 11, 2019

(54) SYSTEM AND METHOD FOR PREPARING ALKALI METAL SALT EMULSIFYING AGENTS

(71) Applicant: Andy Kenowski, Waukesha, WI (US)

(72) Inventor: Andy Kenowski, Waukesha, WI (US)

(73) Assignee: HYDRITE CHEMICAL CO., Brookfield, WI (US)

( * ) Notice: Subject to any disclaimer, the term of this patent is extended or adjusted under 35 U.S.C. 154(b) by 8 days.

(21) Appl. No.: 15/398,122

(22) Filed: Jan. 4, 2017

(65) Prior Publication Data

US 2018/0186641 A1    Jul. 5, 2018

(51) Int. Cl.
| | |
|---|---|
| *B01J 4/02* | (2006.01) |
| *B01J 14/00* | (2006.01) |
| *B01J 19/00* | (2006.01) |
| *C01B 25/30* | (2006.01) |
| *B01J 4/00* | (2006.01) |

(52) U.S. Cl.
CPC ............ *C01B 25/308* (2013.01); *B01J 4/004* (2013.01); *B01J 4/02* (2013.01); *B01J 14/00* (2013.01); *B01J 19/0006* (2013.01); *B01J 19/0013* (2013.01); *B01J 2219/00123* (2013.01); *B01J 2219/00162* (2013.01); *B01J 2219/00164* (2013.01); *B01J 2219/00184* (2013.01)

(58) Field of Classification Search
None
See application file for complete search history.

(56) References Cited

U.S. PATENT DOCUMENTS

| | | | | |
|---|---|---|---|---|
| 3,985,712 A | * | 10/1976 | Garst | B01J 19/0013 528/271 |
| 4,004,880 A | * | 1/1977 | Langheim | B01J 19/0013 256/61 |
| 5,458,909 A | | 10/1995 | Sevenich | |
| 5,466,477 A | | 11/1995 | Sevenich | |
| 5,505,979 A | | 4/1996 | Sevenich | |
| 5,558,435 A | * | 9/1996 | Marjo | B01F 15/00428 366/141 |
| 5,738,772 A | | 4/1998 | Bartasis et al. | |
| 5,891,497 A | | 4/1999 | Bartasis et al. | |
| 2007/0189935 A1 | * | 8/2007 | Yaluris | B01J 8/0015 422/145 |
| 2016/0074820 A1 | | 3/2016 | Kenowski | |

* cited by examiner

*Primary Examiner* — Jennifer A Leung
(74) *Attorney, Agent, or Firm* — Quarles & Brady LLP

(57) ABSTRACT

A system and method combine a first reactant with a second reactant to create a reaction product. A first pump is in fluid communication with a reaction vessel and a source of the first reactant. A second pump is in fluid communication with the reaction vessel and a source of the second reactant. A gas sparger is located in the reaction vessel, and the gas sparger is in fluid communication with a gas source for providing gas to the reaction vessel. A controller is configured to execute a program stored in the controller to: (i) receive a sensor signal based on a force exerted by the reaction vessel in a direction toward the sensor, and (ii) operate the first pump and the second pump to deliver to the reaction vessel the first reactant and the second reactant thereby causing a reaction that creates the reaction product.

17 Claims, 5 Drawing Sheets

SYSTEM AND METHOD FOR PREPARING ALKALI METAL SALT EMULSIFYING AGENTS

CROSS-REFERENCES TO RELATED APPLICATIONS

Not Applicable.

STATEMENT REGARDING FEDERALLY SPONSORED RESEARCH

Not Applicable.

BACKGROUND OF THE INVENTION

1. Field of the Invention

The invention relates to systems and methods for preparing alkali metal salt emulsifying agents. In particular, the invention relates to systems and methods for preparing and dispensing mixtures of disodium phosphate and trisodium phosphate for use as emulsifying agents in the production of food products.

2. Description of the Related Art

The use of alkali metal salts as emulsifying agents in the processing of food products is known. Emulsifying agents such as sodium phosphates and sodium citrates are often used in the manufacture of process cheese. Of the sodium phosphates, monosodium phosphate ($NaH_2PO_4$) (MSP), disodium phosphate ($Na_2HPO_4$) (DSP), and trisodium phosphate ($Na_3PO_4$) (TSP) are often used in process cheese manufacturing.

Process cheese is prepared by heating hard cheese and/or soft cheese in a mixture with the emulsifying agents in a melting process. During this melting process, the insoluble starting cheeses are converted into liquid by means of the emulsifying agents. Sodium phosphates sequester calcium ions in the cheese, solubilize the protein, increase protein hydration and swelling, facilitate the emulsification of fat, and adjust and stabilize pH.

Processes for preparing process cheese may involve the addition of sodium phosphate emulsifying agents as dry solids. These processes have disadvantages. For example, adding solids of sodium phosphates can result in phosphate build up within a cheese cooker because the solid phosphates do not fully dissolve and as a result, the solid phosphates stick to the cooker surfaces. The build-up of phosphates on the inside of the cooker may cause the cheese to burn during the cooking cycle. Undissolved phosphates also give the processed cheese a lumpy consistency. Also, the addition of dry solid sources of disodium phosphate and trisodium phosphate requires human labor to physically add the appropriate amount of the disodium phosphate and/or trisodium phosphate. This results in substantial bag disposal cost, and occasionally, human error in measuring the amount of phosphate to be added.

Processes for preparing process cheese may involve the addition of a combination of concentrated solutions of disodium phosphate and trisodium phosphate from separate heated storage tanks. These processes also have disadvantages. If concentrated liquid sources of disodium phosphate and trisodium phosphate are used in the cheese manufacturing process, these solutions must be stored at elevated temperatures (130° F. to 160° F.) to prevent crystallization of the sodium phosphates from solution. Storing the concentrated disodium phosphate and trisodium phosphate solutions at elevated temperatures requires expensive heating equipment which increases manufacturing costs significantly. Furthermore, if a malfunction allows the temperature to drop, the solutions can crystallize within the delivery system, resulting in expensive downtime.

It can be appreciated that the preparation of process cheese using a dry solid source of sodium phosphates or by adding disodium phosphate or trisodium phosphate solutions stored at elevated temperatures has disadvantages.

Therefore, there exists a need for improved systems and methods for preparing and dispensing mixtures of disodium phosphate and trisodium phosphate for use as emulsifying agents in the production of food products.

SUMMARY OF THE INVENTION

The present invention addresses the foregoing needs by providing a system for combining a first reactant with a second reactant to create a reaction product and for dispensing the reaction product. The system may comprises a reaction vessel; a first pump in fluid communication with the reaction vessel and a first source of a first reactant; a second pump in fluid communication with the reaction vessel and a second source of a second reactant; and a gas sparger located in the reaction vessel. The gas sparger is in fluid communication with a gas source and an interior space of the reaction vessel. The system includes a sensor positioned adjacent the reaction vessel, and the sensor outputs a signal based on a force exerted by the reaction vessel in a direction toward the sensor. The sensor can be a load cell positioned between the reaction vessel and a support for the reaction vessel. The signal from the sensor can be proportional to a weight of the first reactant and the second reactant in the reaction vessel.

The system includes a controller in electrical communication with the first pump, the second pump, and the sensor. The controller is configured to execute a program stored in the controller to: (i) receive the signal from the sensor, and (ii) operate the first pump for a first time period and operate the second pump for a second time period based on the signal from the sensor such that the first reactant and the second reactant are delivered to the reaction vessel and contact of the first reactant and the second reactant causes a reaction that creates a reaction product. The controller can execute the program stored in the controller to operate the first pump for the first time period, and thereafter operate the second pump for the second time period. The first time period and the second time period can be based on a recipe stored in the controller. The first time period and the second time period can be based on one of a plurality of recipes stored in the controller.

The system may further comprise a product discharge conduit having an inlet in fluid communication with the reaction vessel and an outlet in fluid communication with a processing unit, such as a cheese cooker. The controller can execute the program stored in the controller to transfer a reaction product of the first reactant and the second reactant through the product discharge conduit to the processing unit. The controller can execute the program stored in the controller to introduce a gas from the gas source through the gas sparger and into the reaction vessel during or after the reaction that creates the reaction product. Heat from the reaction may generate steam in the interior space of the reaction vessel, and the steam can facilitate transfer of the reaction product of the first reactant and the second reactant through the product discharge conduit to the processing unit. The gas from the gas source may exit the gas sparger at a lower end section of the reaction vessel. The controller can execute the program stored in the controller to introduce the gas from the gas source through the gas sparger and into the reaction vessel after completion of the reaction that creates the reaction product. The steam contacts an inner surface of the product discharge conduit after transfer of the reaction product through the product discharge conduit to the processing unit.

The system may further comprise a pressure relief valve in fluid communication with the interior space of the reaction vessel. The pressure relief valve has a closed position in which pressure is allowed to increase in the interior space of the reaction vessel and an open position in which pressure is released from the interior space of the reaction vessel. The controller can execute the program stored in the controller to: (i) place the pressure relief valve in the closed position before operating the first pump for the first time period and operating the second pump for a second time period, and (ii) move the pressure relief valve to the open position when a threshold pressure is reached in the interior space of the reaction vessel.

In one version of the system, the first reactant comprises an aqueous solution of a first alkali metal salt, the second reactant comprises a base of the first alkali metal, and the reaction product comprises a second alkali metal salt different from the first alkali metal salt. The reaction product may comprise a third alkali metal salt, wherein the third alkali metal salt is different from the second alkali metal salt, and wherein the third alkali metal salt is different from the first alkali metal salt. In one version of the system, the first reactant comprises an aqueous solution of monosodium phosphate, the second reactant comprises aqueous sodium hydroxide, and the reaction product comprises a liquid mixture of disodium phosphate and trisodium phosphate.

In another aspect, the invention provides a method for preparing a second alkali metal salt from an aqueous solution of a first alkali metal salt and dispensing the second alkali metal salt. The method includes the steps of: combining an aqueous solution of a first alkali metal salt with a base of the first alkali metal in a reaction vessel; reacting the first alkali metal salt with the base of the first alkali metal such that a second alkali metal salt and steam form in the reaction vessel, wherein the second alkali metal salt is different from the first alkali metal salt; and utilizing the steam to transfer the second alkali metal salt through a product discharge outlet of the reaction vessel. In one version of the method, the first alkali metal salt comprises monosodium phosphate, the base of the first alkali metal comprises aqueous sodium hydroxide, and the second alkali metal salt comprises one of disodium phosphate and trisodium phosphate. The method may further comprise introducing a gas from a gas source through a gas sparger into the reaction vessel during or after reacting the first alkali metal salt with the base of the first alkali metal.

The systems and methods according to the invention for preparing alkali metal salt emulsifying agents have many advantages. For example, disodium phosphate and trisodium phosphate can be prepared on demand, reliably and reproducibly. Weight based addition of reactants in the systems and methods according to the invention provides for more precise control of the ratio of reactants compared to systems that use flow meters. The steam pressure based product delivery mechanism in the systems and methods according to the invention provides for increased disinfection of the product discharge conduits of the system. The system according to the invention is portable and has a small footprint thereby allowing for remote location use of the system. The system according to the invention includes data storage such that customer specific reaction recipes can be stored in the system for future use. The data storage in the controller of the system of the invention logs data in real time such that detailed reports of reactant usage can be prepared. Wireless monitoring/alarms of the system of the invention provide for warnings of less than optimum system performance. The system of the invention also allows for batch or continuous cook applications as a closed system using a single controller.

These and other features, aspects, and advantages of the present invention will become better understood upon consideration of the following detailed description, drawings, and appended claims.

BRIEF DESCRIPTION OF THE DRAWINGS

Like reference numerals will be used to refer to like parts from Figure to Figure in the following description of the drawings.

DETAILED DESCRIPTION OF THE INVENTION

In one non-limiting example embodiment, a system of the invention is used for combining a first reactant (e.g., aqueous monosodium phosphate) with a second reactant (e.g., aqueous sodium hydroxide) to create and dispense a reaction product (e.g., a liquid mixture of disodium phosphate and trisodium phosphate). The system can be a weight based pressure reactor arrangement suitable for making and dispensing trisodium phosphate and disodium phosphate into processed cheese cookers. Process flow starts with the first reactant (monosodium phosphate) being delivered into a pressurizable reaction vessel to the desired amount, then the second reactant (50% sodium hydroxide) being added into the reaction vessel. There is an exothermic heat reaction of about 225° F. generated. Once this heat reaction is complete, an air sparge is introduced into the disodium phosphate and/or trisodium phosphate reaction product cooling down to 190° F. The air sparging process in the reactor generates steam up to 212° F. which is used for the dispensing process. This can all be accomplished through the reaction vessel. The last step is the dispensing of reaction product which has a freeze point of about 140° F. The superheated steam in the pressurized heated reaction vessel pushes the reaction product to the process cheese cooker and at the end of the dispensing, the steam clears and disinfects the product discharge conduit extending from the reaction vessel to the cheese cooker providing for increased sterility.

Figure 1:
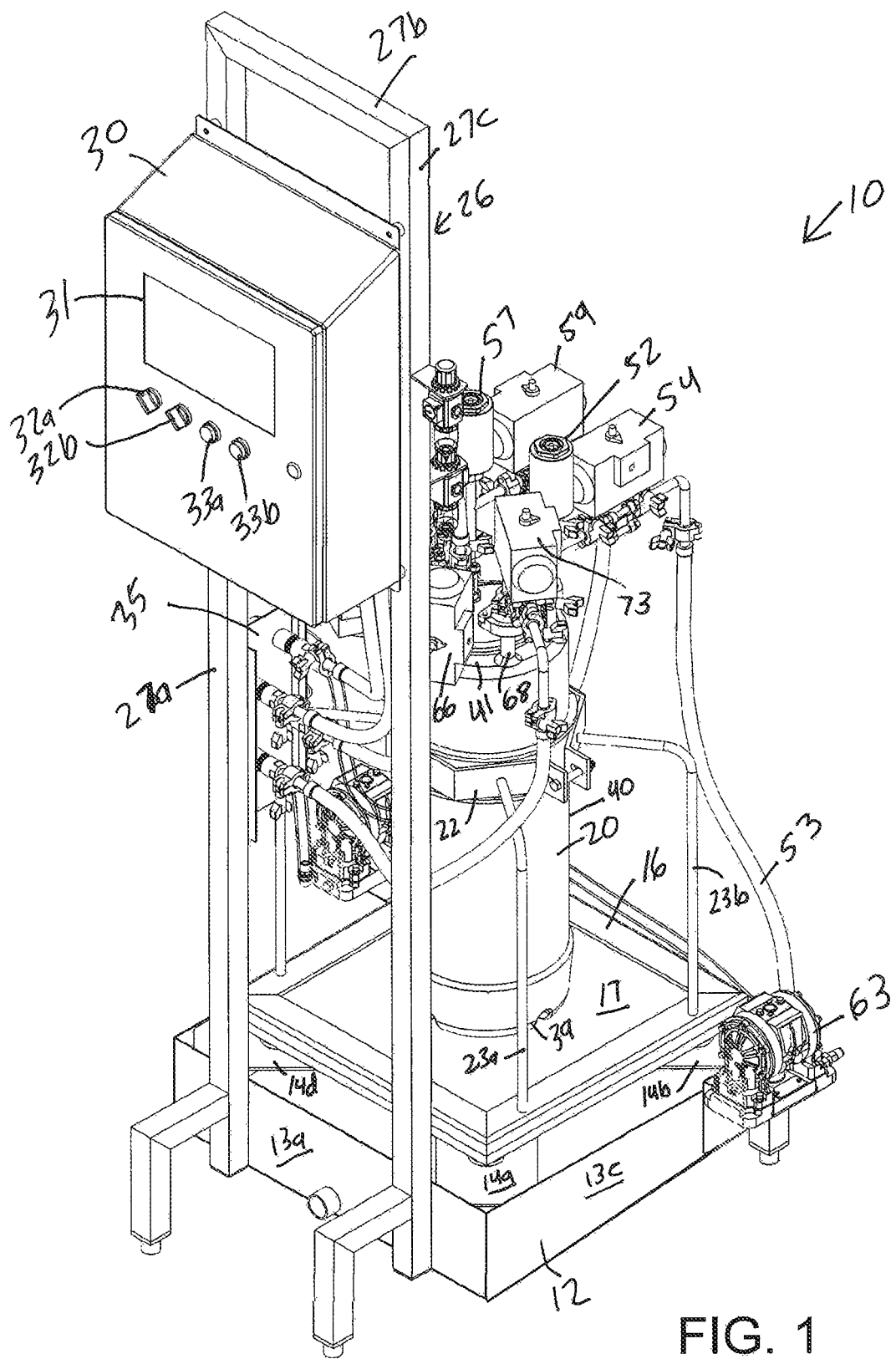
FIG. 1 is a top, right, front perspective view of an example system according to the invention for combining reactants to create a reaction product.
Figure 2:
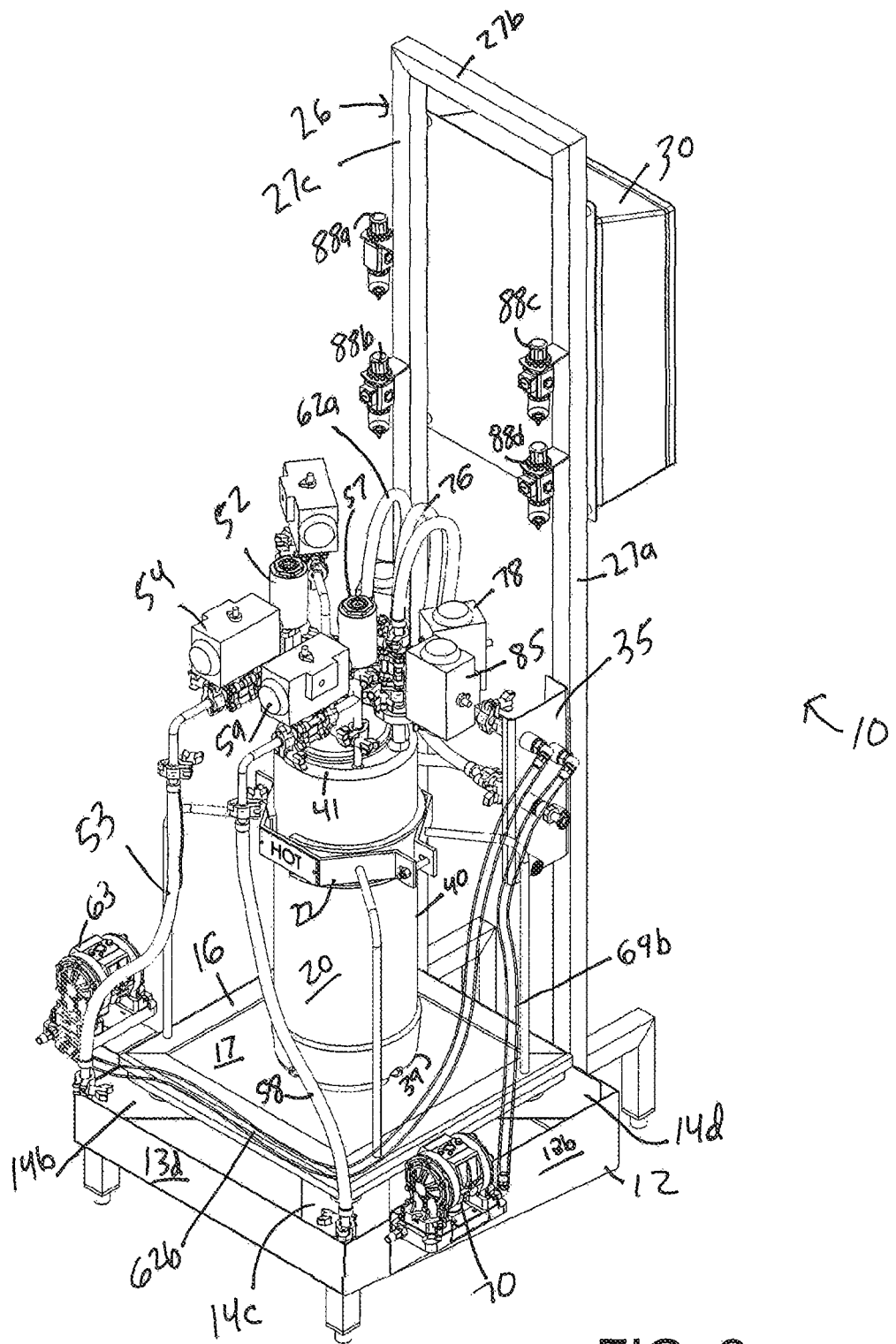
FIG. 2 is a top, left, rear perspective view of the system of FIG. 1.
Figure 3:
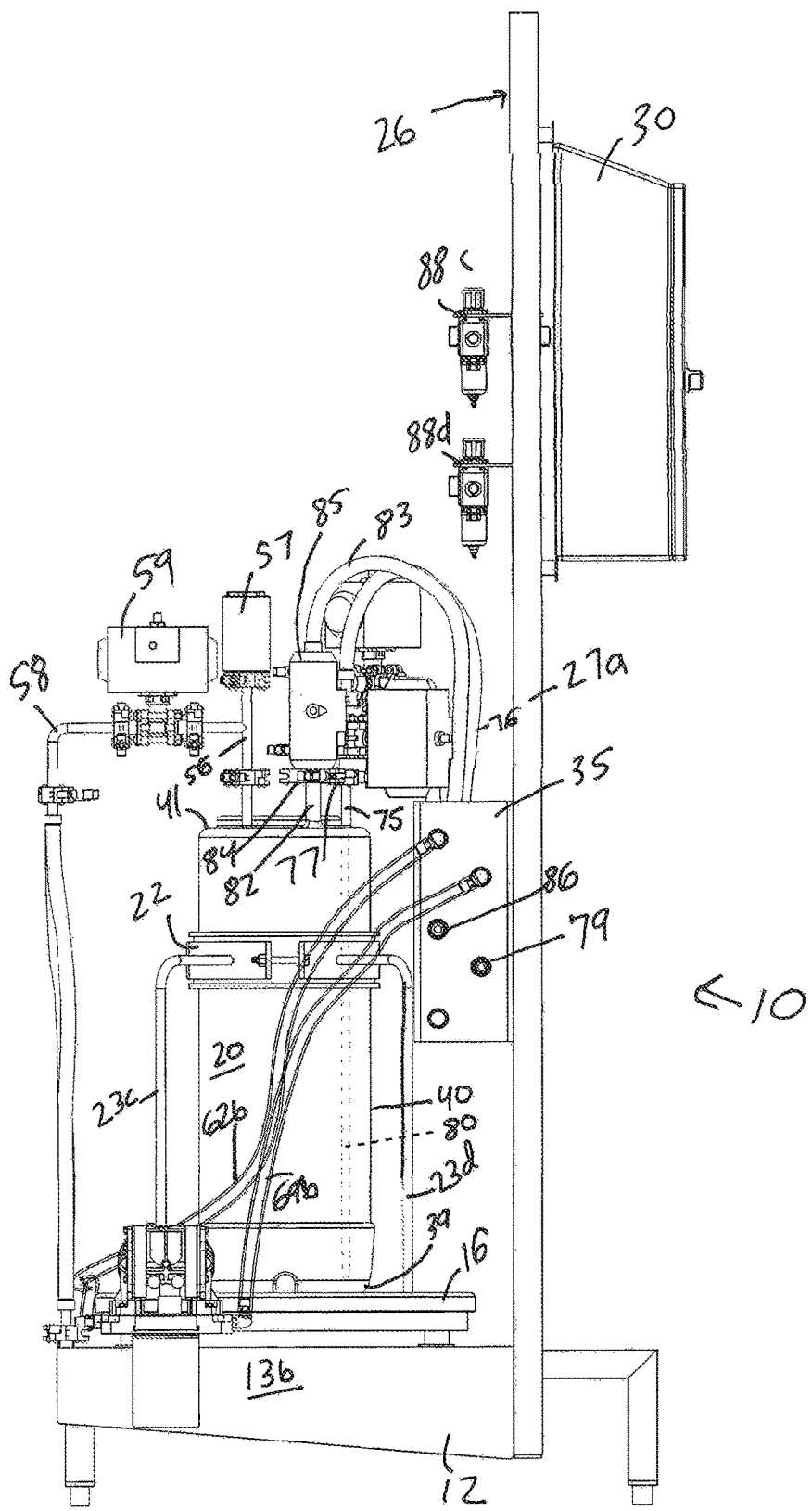
FIG. 3 is a left side view of the system of FIG. 1.
Figure 4:
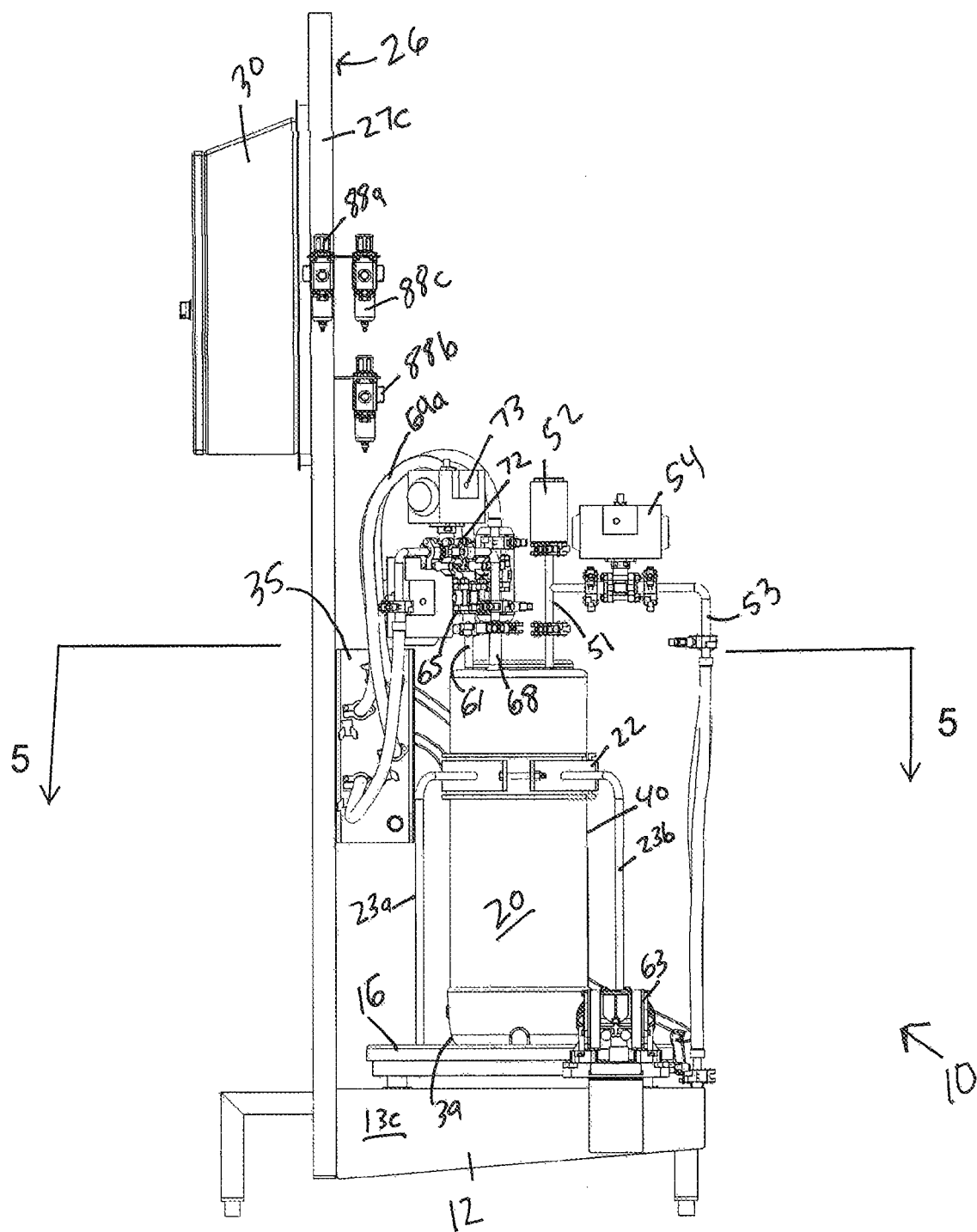
FIG. 4 is a right side view of the system of FIG. 1.
Figure 5:
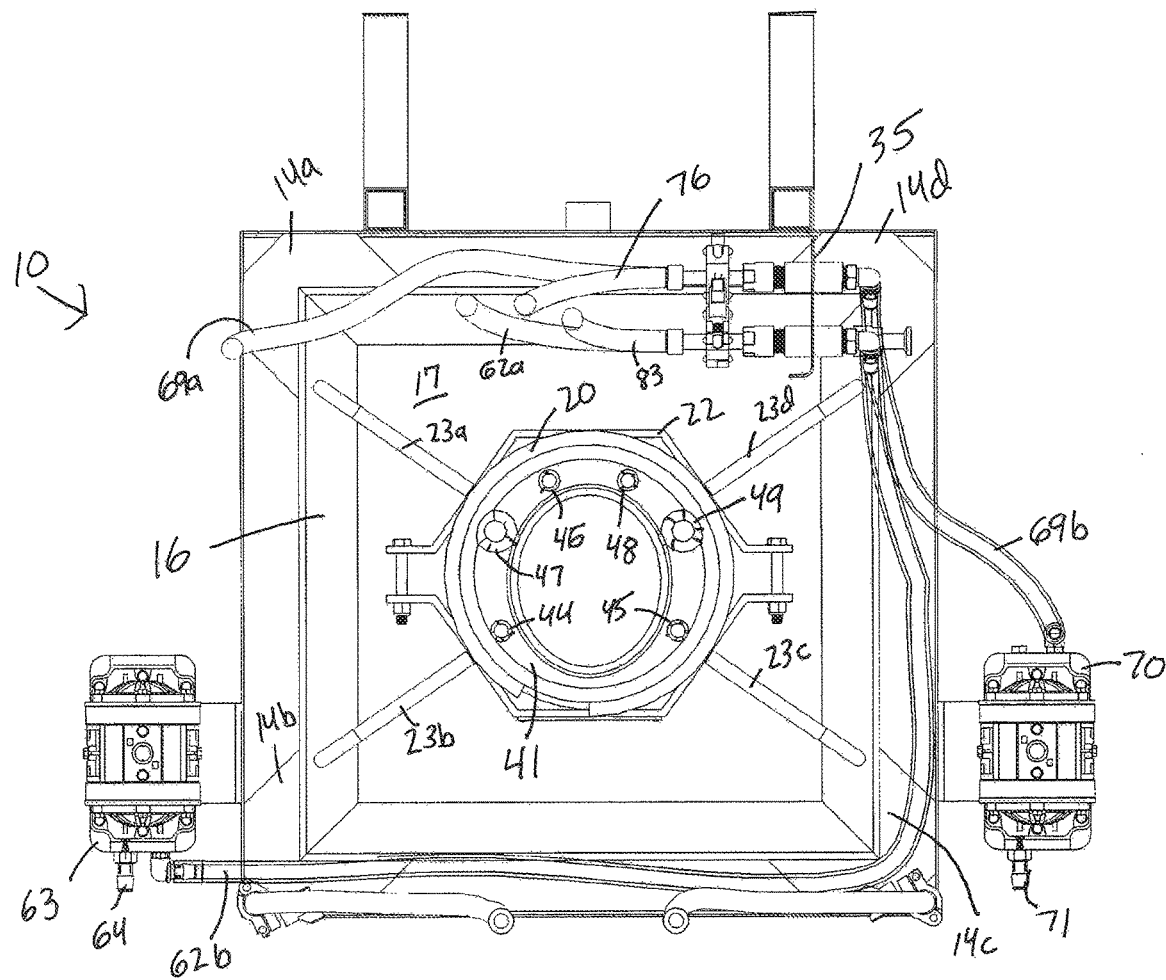
FIG. 5 is a cross-sectional view of the system of FIG. 1 taken along line 5-5 of FIG. 4.

Turning now to FIGS. 1 to 5, there is shown a non-limiting example system 10 according to the invention for combining reactants to create a reaction product. The system 10 includes a base 12 having vertical side walls 13a, 13b, 13c, 13d and having inwardly extending horizontal flanges 14a, 14b, 14c, 14d at the corners of the rectangular base 12.

A support 16 is positioned on the flanges 14a, 14b, 14c, 14d of the base 12. The support 16 has an inner wall section 17.

The system 10 includes a reaction vessel 20 that is positioned on the inner wall section 17 of the support 16. A load cell can be positioned between the reaction vessel 20 and the inner wall section 17 of the support 16. The load cell weighs the contents of the reaction vessel 20. A mounting collar 22 is secured at the end of support arms 23a, 23b, 23c, 23d. The mounting collar 22 surrounds the reaction vessel 20 to keep the reaction vessel 20 stable on the support 16.

The system 10 includes a mounting bracket 26 formed by framing members 27a, 27b, 27c. A housing 30 is mounted on the mounting bracket 26. The housing includes a display 31, rotating selector switches 32a, 32b, and push selector buttons 33a, 33b for controlling operation of the system 10. A controller is enclosed in the housing 30. The system 10 is activated by the controller to combine a first reactant with a second reactant to create a reaction product. Generally, the controller may be a programmable logic controller (PLC) that controls activation of pumps and air solenoid valves of the system 10. A second mounting bracket 35 is attached to the mounting bracket 26. The second mounting bracket 35 supports various fluid connection fittings of the system 10.

The reaction vessel 20 of the system 10 has a bottom wall 39, a side wall 40, and a top wall 41 forming a generally cylindrical vessel. Looking at FIG. 5, the top wall 41 of the reaction vessel 20 has a first vent port 44, a second vent port 45, a first reactant port 46, a second reactant port 47, a gas sparge port 48, and a product discharge port 49. The number of reactant ports can be increased for reactions using more than two reactants, and a single vent port, instead of multiple vent ports, may be suitable for other reactions. Likewise, the number of product discharge ports can be increased.

The system 10 includes a T-shaped fitting 51 connected to the first vent port 44 of the reaction vessel 20. The fitting 51 places a first pressure relief unit 52 in fluid communication with the interior space of the reaction vessel 20. A first venting conduit 53 is in fluid communication with the fitting 51 and a second pressure relief unit 54. In the event that pressure within the reaction vessel 20 exceeds a predetermined threshold pressure, normally closed valves in the first pressure relief unit 52 and/or the second pressure relief unit 54 will open and relief the overpressure condition in the reaction vessel 20.

The system 10 also includes a second T-shaped fitting 56 connected to the second vent port 45 of the reaction vessel 20. The fitting 56 places a third pressure relief unit 57 in fluid communication with the interior space of the reaction vessel 20. A second venting conduit 58 is in fluid communication with the fitting 56 and a fourth pressure relief unit 59. In the event that pressure within the reaction vessel 20 exceeds a predetermined threshold pressure, normally closed valves in the third pressure relief unit 57 and/or the fourth pressure relief unit 59 will open and relief the overpressure condition in the reaction vessel 20.

The system 10 includes a first reactant port fitting 61 connected to the first reactant port 46 of the reaction vessel 20. The fitting 61 places a reactant conduit 62a in fluid communication with the interior space of the reaction vessel 20. The reactant conduit 62a is placed in fluid communication with another reactant conduit 62b by way of a fitting on the second mounting bracket 35. The reactant conduit 62b is fluidly connected to a first reactant pump 63 which is mounted on the base 12. The first reactant pump 63 receives on-off electrical signals from the controller. A first reactant pump fitting 64 allows the first reactant pump 63 to be fluidly connected via a conduit to a source (e.g., a 55 gallon drum) of a first reactant. A normally closed air solenoid valve 65 is located in the fluid path of the reactant conduit 62a. When in an open position, the air solenoid valve 65 allows a first reactant to flow from the first reactant pump 63 to the interior space of the reaction vessel 20 if the first reactant pump 63 is activated. In the event that pressure within the reactant conduit 62a exceeds a predetermined threshold pressure, a normally closed valve in a pressure relief unit 66 will open and relief the overpressure condition.

The system 10 also includes a second reactant port fitting 68 connected to the second reactant port 47 of the reaction vessel 20. The fitting 68 places a reactant conduit 69a in fluid communication with the interior space of the reaction vessel 20. The reactant conduit 69a is placed in fluid communication with a reactant conduit 69b by way of a fitting on the second mounting bracket 35. The reactant conduit 69b is fluidly connected to a second reactant pump 70 which is mounted on the base 12. The second reactant pump 70 receives on-off electrical signals from the controller. A second reactant pump fitting 71 allows the second reactant pump 70 to be fluidly connected via a conduit to a source (e.g., a 55 gallon drum) of a second reactant. A normally closed air solenoid valve 72 is located in the fluid path of the reactant conduit 69a. When in an open position, the air solenoid valve 72 allows a second reactant to flow from second reactant pump 70 to the interior space of the reaction vessel 20 if the second reactant pump 70 is activated. In the event that pressure within the reactant conduit 69a exceeds a predetermined threshold pressure, a normally closed valve in a pressure relief unit 73 will open and relief the overpressure condition.

The system 10 also includes a gas sparge port fitting 75 connected to the gas sparge port 48 of the reaction vessel 20. The fitting 75 places a gas sparge conduit 76 in fluid communication with the interior space of the reaction vessel 20. A gas sparge inlet fitting 79 is located on the second mounting bracket 35, and the gas sparge inlet fitting 79 allows the gas sparge conduit 76 to be placed in fluid communication with a source of pressurized gas (e.g., air). A normally closed air solenoid valve 77 is located in the fluid path of the gas sparge conduit 76. When in an open position, the air solenoid valve 77 allows a gas to flow from gas sparge inlet fitting 79 through the gas sparge conduit 76 and to the interior space of the reaction vessel 20 via a gas sparge tube 80 that extends to a location adjacent the bottom wall 39 of the reaction vessel 20. In the event that pressure within the gas sparge conduit 76 exceeds a predetermined threshold pressure, a normally closed valve in a pressure relief unit 78 will open and relief the overpressure condition.

The system 10 also includes a product discharge port fitting 82 connected to the product discharge port 49 of the reaction vessel 20. The fitting 82 places a product discharge conduit 83 in fluid communication with the interior space of the reaction vessel 20. A product discharge outlet fitting 86 is located on the second mounting bracket 35, and the product discharge outlet fitting 86 allows the product discharge conduit 83 to be placed in fluid communication with a processing unit, such as the cheese cooker of a process cheese making system. A normally closed air solenoid valve 84 is located in the fluid path of the product discharge conduit 83. When in an open position, the air solenoid valve 84 allows a reaction product to flow from the interior space of the reaction vessel 20 through the product discharge conduit 83 and to the product discharge outlet fitting 86. In the event that pressure within the product discharge conduit 83 exceeds a predetermined threshold pressure, a normally closed valve in a pressure relief unit 85 will open and relief the overpressure condition.

The system 10 includes normally closed air supply valves 88a, 88b, 88c, 88d mounted on the mounting bracket 26. Each of the air supply valves 88a, 88b, 88c, 88d is in fluid communication (not shown) with a source of pressurized air. Also, each of the air supply valves 88a, 88b, 88c, 88d is in fluid communication (not shown) with one of the air solenoid valves 65, 72, 77, 84, respectively. Each of the air supply valves 88a, 88b, 88c, 88d is also in electrical communication with the controller.

For the air supply valve 88a, the controller provides an electrical signal to the air supply valve 88a which causes the air supply valve 88a to open thereby allowing air to flow to the air solenoid valve 65 which opens the air solenoid valve 65. Then, the air solenoid valve 65 allows a first reactant to flow from the first reactant pump 63 to the interior space of the reaction vessel 20 if the first reactant pump 63 is activated by an electrical signal from the controller.

For the air supply valve 88b, the controller provides an electrical signal to the air supply valve 88b which causes the air supply valve 88b to open thereby allowing air to flow to the air solenoid valve 72 which opens the air solenoid valve 72. Then, the air solenoid valve 72 allows a second reactant to flow from the second reactant pump 70 to the interior space of the reaction vessel 20 if the second reactant pump 70 is activated by an electrical signal from the controller.

For the air supply valve 88c, the controller provides an electrical signal to the air supply valve 88c which causes the air supply valve 88c to open thereby allowing air to flow to the air solenoid valve 77 which opens the air solenoid valve 77. Then, the air solenoid valve 77 allows a gas to flow from gas sparge inlet fitting 79 through the gas sparge conduit 76 and to the interior space of the reaction vessel 20 via a gas sparge tube 80.

For the air supply valve 88d, the controller provides an electrical signal to the air supply valve 88d which causes the air supply valve 88d to open thereby allowing air to flow to the air solenoid valve 84 which opens the air solenoid valve 84. Then, the air solenoid valve 84 allows a reaction product to flow from the interior space of the reaction vessel 20 through the product discharge conduit 83 and to the product discharge outlet fitting 86 for use in a processing unit such as a cheese cooker.

The system 10 may also include various process monitoring systems. For example, the controller may be in electrical communication with the pressure relief units 52, 54, 57, 59, 66, 73, 78, 85 for confirming that the valves of the pressure relief units are operating correctly. The controller may be in electrical communication with one or more temperature sensors within the reaction vessel 20 or associated conduits to monitor for a temperature condition indicating possible freezing of the reactants or reaction products. The controller may be in electrical communication with one or more pressure sensors within the reaction vessel 20 or associated conduits to monitor for over or under pressure process conditions. The controller may be in electrical communication with one or more turbidity sensors within the reaction vessel 20 or associated conduits to monitor for product clarity. The controller may be in electrical communication with one or more pH sensors within the reaction vessel 20 or associated conduits to monitor for proper pH process conditions.

Having described the construction of the system 10, the operation of the system 10 will now be described with reference to an example chemical reaction. Specifically, the operation of the system 10 will be described using the preparation of a liquid mixture of disodium phosphate and trisodium phosphate as the example chemical reaction. Monosodium phosphate (MSP) is available as a 45% by weight aqueous solution that is stable and pumpable at room temperature. Monosodium phosphate can be reacted with caustic soda (typically available as a 50% by weight aqueous solution of sodium hydroxide) to form a liquid mixture of disodium phosphate (DSP) and trisodium phosphate (TSP). The reaction is exothermic, tempered starting with MSP.

DSP formation is as follows: $NaH_2PO_4 + NaOH \rightarrow Na_2HPO_4 + H_2O$.

TSP formation is as follows: $NaH_2PO_4 + 2NaOH \rightarrow Na_3PO_4 + 2H_2O$.

By controlling the weight ratio of the sodium hydroxide to liquid monosodium sodium phosphate in the reaction using the controller of the system of the invention, the weight ratio of monosodium phosphate, disodium phosphate, and trisodium phosphate in the final liquid reaction product mixture can be controlled. Numerous recipes for the preparation of the phosphate reaction product are possible and can be stored in the controller. Furthermore, these recipes for liquid phosphate reaction products can be designed using conventional dry recipes as the starting point for user input. For example, a user can enter the typical desired dry weight ratio of disodium phosphate and trisodium phosphate in the process cheese recipe. The controller can convert the dry weight ratio of disodium phosphate and trisodium phosphate to a recipe suitable for use in a liquid phosphate reaction product prepared and dispensed by the system 10 of the invention.

The system 10 utilizes the reaction vessel 20 and the load cell in electrical communication with the controller to create a precise weight ratio of monosodium phosphate and sodium hydroxide in the reaction vessel 20. Each reactant used is pumped into the reaction vessel 20 and weighed to achieve the desired weight ratio of the reactants. The controller logs data in real time in a data storage device. For example, usage per day of the reactants can be stored in the data storage device. When using the controller for the first time, the controller performs a system check in which system faults are detected. Non-limiting example system faults are: valve(s) are not opening; reaction vessel 20 has product in it; communication cable(s) are disconnected from controller; and/or the load cell is defective.

The product selector switch 32a is then used to choose between various phosphate recipes stored in the controller. Once the recipe is selected, the controller can be activated using selector switch 32b. The controller opens normally closed air solenoid valve 65 and activates the first reactant pump 63 which allows monosodium phosphate to flow from the first reactant pump 63 to the interior space of the reaction vessel 20. The load cell will sense an increase in force as the load cell is in contact with the reaction vessel 20. The signal from the load cell to the controller is proportional to the weight of the monosodium phosphate in the reaction vessel 20. The program stored in the controller can convert the signal from the load cell to a weight, and flow of the monosodium phosphate is stopped by the controller (by closing air solenoid valve 65 and deactivating the first reactant pump 63) when the weight of monosodium phosphate programmed in the recipe is reached.

In a next process step of the program stored in the controller, the controller opens normally closed air solenoid valve 72 and activates the second reactant pump 70 which allows sodium hydroxide to flow from the second reactant pump 70 to the interior space of the reaction vessel 20. The load cell will sense an increase in force as the load cell is in contact with the reaction vessel 20. The signal from the load cell to the controller is proportional to the weight of the monosodium phosphate and sodium hydroxide in the reaction vessel 20. The program stored in the controller can convert the signal from the load cell to a weight of sodium hydroxide added, and flow of the sodium hydroxide is stopped by the controller (by closing air solenoid valve 72 and deactivating the second reactant pump 70) when the weight of sodium hydroxide programmed in the recipe is reached.

In a next process step of the program stored in the controller, each air solenoid valve 65, 72, 77, 84 is confirmed to be closed, and the monosodium phosphate and the sodium hydroxide react in the reaction vessel 20 in an exothermic heat reaction with a temperature of about 225° F. being reached. Once the monosodium phosphate/sodium hydroxide reaction is complete, the controller opens the air solenoid valve 77 allowing a gas (e.g., air) to flow from the gas sparge inlet fitting 79 through the gas sparge conduit 76 and into the interior space of the reaction vessel 20 via the gas sparge tube 80 that extends to a location adjacent the bottom wall 39 of the reaction vessel 20. The air sparging process in the reaction vessel 20 generates steam up to 212° F. which is used for the dispensing process. The controller then closes the air solenoid valve 77.

In a last process step of this example program stored in the controller, the controller opens the air solenoid valve 84. This allows the reaction product (a liquid mixture of disodium phosphate and trisodium phosphate) to flow from the interior space of the reaction vessel 20 through the product discharge conduit 83 and to the product discharge outlet fitting 86. The product discharge outlet fitting 86 can be in fluid communication with a food processing unit, such as the cheese cooker of a process cheese making system. In this last process step, steam in the pressurized heated reaction vessel 20 pushes the reaction product to the product discharge outlet fitting 86 and to the food processing unit. The steam clears and disinfects the product discharge conduit 83, the product discharge outlet fitting 86, and the conduit extending to the food processing unit. Then, any of the programs stored in the controller can be selected for another product run.

Thus, the invention provides systems and methods for preparing alkali metal salt emulsifying agents. In particular, the invention provides systems and methods for preparing and dispensing mixtures of disodium phosphate and trisodium phosphate for use as emulsifying agents in the production of food products, such as process cheese.

Although the present invention has been described in detail with reference to certain embodiments, one skilled in the art will appreciate that the present invention can be practiced by other than the described embodiments, which have been presented for purposes of illustration and not of limitation. Therefore, the scope of the appended claims should not be limited to the description of the embodiments contained herein.

What is claimed is:

1. A system for combining a first reactant with a second reactant to create a reaction product and for dispensing the reaction product, the system comprising:
 a reaction vessel;
 a first pump in fluid communication with the reaction vessel and a first source of a first reactant;
 a second pump in fluid communication with the reaction vessel and a second source of a second reactant;
 a product discharge conduit in fluid communication with the reaction vessel;
 a gas sparger located in the reaction vessel, the gas sparger being in fluid communication with a gas source and an interior space of the reaction vessel;
 a sensor positioned adjacent the reaction vessel, the sensor outputting a signal based on a force exerted by the reaction vessel in a direction toward the sensor; and
 a controller in electrical communication with the first pump, the second pump, the gas sparger, and the sensor, the controller being configured to execute a program stored in the controller to:
 (i) receive the signal from the sensor;
 (ii) operate the first pump for a first time period and operate the second pump for a second time period based on the signal from the sensor such that the first reactant and the second reactant are delivered to the reaction vessel and contact of the first reactant and the second reactant causes a reaction that creates a reaction product; and
 (iii) introduce gas from the gas source through the gas sparger to the reaction vessel in an amount sufficient to cool the reaction product and generate steam within the reaction vessel, and wherein the amount of the gas delivered to the reaction vessel is sufficient to increase the pressure within the reaction vessel such that when the product discharge conduit is opened at least a portion of the reaction product is dispensed from the reaction vessel.

2. The system of claim 1 wherein:
the product discharge conduit includes an inlet in fluid communication with the reaction vessel and an outlet in fluid communication with a processing unit,
wherein the controller executes the program stored in the controller to transfer the reaction product of the first reactant and the second reactant through the product discharge conduit to the processing unit.

3. The system of claim 1 wherein:
heat from the reaction generates steam in the interior space of the reaction vessel.

4. The system of claim 3 wherein:
the steam facilitates transfer of the reaction product of the first reactant and the second reactant through the product discharge conduit to the processing unit.

5. The system of claim 4 wherein:
the gas from the gas source exits the gas sparger at a lower end section of the reaction vessel.

6. The system of claim 4 wherein:
the controller executes the program stored in the controller to introduce the gas from the gas source through the gas sparger and into the reaction vessel after completion of the reaction that creates the reaction product.

7. The system of claim 4 wherein:
the steam contacts an inner surface of the product discharge conduit after transfer of the reaction product through the product discharge conduit to the processing unit.

8. The system of claim 1 wherein:
the sensor is a load cell positioned between the reaction vessel and a support for the reaction vessel.

9. The system of claim 1 wherein:
the controller executes the program stored in the controller to operate the first pump for the first time period, and thereafter operate the second pump for the second time period.

10. The system of claim 1 further comprising:
a pressure relief valve in fluid communication with the interior space of the reaction vessel, the pressure relief valve having a closed position in which pressure is allowed to increase in the interior space of the reaction vessel and an open position in which pressure is released from the interior space of the reaction vessel,
wherein the controller executes the program stored in the controller to: (i) place the pressure relief valve in the closed position before operating the first pump for the first time period and operating the second pump for a second time period, and (ii) move the pressure relief valve to the open position when a threshold pressure is reached in the interior space of the reaction vessel.

11. The system of claim 1 wherein:
the first reactant comprises an aqueous solution of a first alkali metal salt;
the second reactant comprises a base of the first alkali metal; and
the reaction product comprises a second alkali metal salt different from the first alkali metal salt.

12. The system of claim 11 wherein:
the reaction product comprises a third alkali metal salt,
the third alkali metal salt is different from the second alkali metal salt, and
the third alkali metal salt is different from the first alkali metal salt.

13. The system of claim 1 wherein:
the first reactant comprises an aqueous solution of monosodium phosphate;
the second reactant comprises sodium hydroxide; and
the reaction product comprises a mixture of disodium phosphate and trisodium phosphate.

14. The system of claim 1 wherein:
the first time period and the second time period are based on a recipe stored in the controller.

15. The system of claim 1 wherein:
the first time period and the second time period are based on one of a plurality of recipes stored in the controller.

16. The system of claim 1 wherein:
the signal from the sensor is proportional to a weight of the first reactant and the second reactant in the reaction vessel.

17. A system for combining a first reactant with a second reactant to create a reaction product and for dispensing the reaction product, the system comprising:
a reaction vessel;
a first pump in fluid communication with the reaction vessel and a first source of a first reactant, the first reactant comprising an aqueous solution of an alkali metal salt;
a second pump in fluid communication with the reaction vessel and a second source of a second reactant, wherein the second reactant comprises an aqueous basic solution;
a product discharge conduit having an inlet in fluid communication with the reaction vessel and an outlet in fluid communication with a process unit;
a gas sparger located in the reaction vessel, the gas sparger being in fluid communication with a gas source and an interior space of the reaction vessel;
a controller in electrical communication with the first pump, the second pump, and the gas sparger, the controller being configured to execute a program stored in the controller to:
 (i) operate the first pump for a first time period and operate the second pump for a second time period such that the first reactant and the second reactant are delivered to the reaction vessel and contact of the first reactant and the second reactant causes an exothermic reaction that creates a reaction product; and
 (ii) introduce gas from the gas source through the gas sparger to the reaction vessel in an amount sufficient to cool the reaction product and generate steam within the reaction vessel, and wherein the amount of the gas delivered to the reaction vessel is sufficient to increase the pressure within the reaction vessel such that when the product discharge conduit is opened at least a portion of the reaction product is dispensed from the reaction vessel, and wherein the steam contacts an inner surface of the product discharge conduit after transfer of the reaction product through the product discharge conduit to the processing unit to sanitize the inner surface of the product discharge conduit.

* * * * *